(12) United States Patent
Jeong et al.

(10) Patent No.: US 8,750,207 B2
(45) Date of Patent: Jun. 10, 2014

(54) ADAPTING TRANSMISSION TO IMPROVE QOS IN A MOBILE WIRELESS DEVICE

(75) Inventors: Hyeonkuk Jeong, Saratoga, CA (US); Sundararaman V. Shiva, Los Gatos, CA (US); Yan Yang, San Jose, CA (US); Joe S. Abuan, San Jose, CA (US); Jianxiong Shi, Pleasanton, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 12/906,000

(22) Filed: Oct. 15, 2010

(65) Prior Publication Data

US 2012/0092991 A1    Apr. 19, 2012

(51) Int. Cl.
*H04W 4/00*       (2009.01)

(52) U.S. Cl.
USPC .......................................................... 370/328

(58) Field of Classification Search
USPC ................................ 370/328, 329; 455/422.1
See application file for complete search history.

(56) References Cited

U.S. PATENT DOCUMENTS

| | | |
|---|---|---|
| 2004/0240390 A1 | 12/2004 | Seckin |
| 2005/0099961 A1 | 5/2005 | Holma |
| 2008/0076442 A1 | 3/2008 | Ishii et al. |
| 2008/0192685 A1 | 8/2008 | Usuda et al. |
| 2008/0261606 A1 | 10/2008 | Usuda et al. |
| 2008/0299963 A1* | 12/2008 | Balachandran et al. ... 455/422.1 |
| 2009/0067372 A1* | 3/2009 | Shah et al. .................... 370/328 |
| 2010/0135156 A1 | 6/2010 | Sarkar |
| 2010/0195602 A1* | 8/2010 | Kovvali et al. ................ 370/329 |
| 2010/0217888 A1 | 8/2010 | Ukita et al. |

OTHER PUBLICATIONS

El-Marakby et al., "Enhanced QoS for Real-time Multimedia Delivery over the Wireless Link using RFID Technology", 2006 IEEE International Symposium on Signal Processing and Information Technology, pp. 728-734.
Yoshimura et al., "Rate and Robustness Control with RTP Monitoring Agent for Mobile Multimedia Streaming", 2002 IEEE International Conference on Communications, pp. 2513-2571.
International Search Report dated Feb. 7, 2012 for PCT Application No. PCT/US2011/055094.
Written Opinion dated Feb. 7, 2012 for PCT Application No. PCT/US2011/055094.

* cited by examiner

*Primary Examiner* — Andrew Chriss
*Assistant Examiner* — Peter Mak
(74) *Attorney, Agent, or Firm* — Womble Carlyle Sandridge & Rice LLP

(57) ABSTRACT

A method and apparatus for adapting transmission to improve quality of service in a mobile wireless device that includes an application processor and a transceiver. An application service connection is established between the mobile wireless device and a remote device. The transceiver in the mobile wireless device monitors real time properties of a radio frequency access link that transports packets for the application service between the mobile wireless device and a wireless communication network. The transceiver provides local feedback to the application processor of updated values of the monitored real time properties. The application processor adjusts packet data generation and transmission in response to the updated values to manage quality of service for the application service connection. Packet data transmission adjustment includes active management of queues in the transceiver by the application processor, selectively dropping packets based on packet classifications and the local feedback information provided to the application processor.

25 Claims, 10 Drawing Sheets

ADAPTING TRANSMISSION TO IMPROVE QOS IN A MOBILE WIRELESS DEVICE

TECHNICAL FIELD

The described embodiments relate generally to wireless mobile communications. More particularly, a method and apparatus is described for adapting transmission to improve quality of service (QoS) in a mobile wireless device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Each of these applications can have different service requirements for operating characteristics, such as performance parameters for delay latency, packet loss and jitter tolerance. Providing the capability for end to end quality of service (QoS) for an application can prove difficult, as packets can traverse through multiple independent nodes between the mobile wireless communication device and a destination end point. In a wireless access network portion of a connection, limited radio frequency bandwidth can be shared by multiple users, and the transmission capabilities of the wireless access network portion can change dynamically over time. Adapting the generation and transmission of a higher layer application service's packets to dynamically changing lower layer transmission level flows that transport the packets can improve QoS for the higher layer application service.

IP networks were originally designed for best effort delivery of data that could tolerate indeterminate delay and packet loss. For time insensitive data transfer, such as when downloading a file or sending an email, such a best effort connection can suffice; however, other services can require a minimum throughput level or a maximum delay to guarantee a level of QoS. Providing QoS through a best effort connection can prove difficult. A number of applications can perform better over a connection having a set of guaranteed properties than through a best effort connection when decoupling lower layer transmission of packets from higher layer generation and management of packets. For example, real time conversational voice connections and high quality video conferencing services were originally designed for fixed rate circuit switched connections with minimal delay. Adapting an application service, such as a real time video and audio connection between two mobile wireless devices, to a best effort connection that can encounter variable bit rates and delays on the wireless access portions of the connection, can prove challenging.

Thus there exists a need to adapt the generation, management and transmission of packets in a mobile wireless device to improve quality of service.

SUMMARY OF THE DESCRIBED EMBODIMENTS

The described embodiments relate generally to wireless mobile communications. More particularly, a method and apparatus is described for packet classification and prioritization using an internet protocol (IP) header in a mobile wireless communication device.

In one embodiment, a method to manage quality of service in a mobile wireless device can include at least the following steps. The mobile wireless device can establish an application service connection between an application processor in the mobile wireless device and a remote device through a wireless communication network. A transceiver in the mobile wireless device can monitor at least one real time property of a radio frequency access link between the mobile wireless device and the wireless communication network. Packets generated by the application processor in the mobile wireless device for the application service connection can be transmitted by the transceiver over the radio frequency access link. The transceiver can provide to the application processor updated values of the monitored at least one real time property of the radio frequency access link. The application processor can adjust packet data generation in response to the updated values to manage a quality of service property of the application service connection.

In another embodiment, a wireless apparatus includes at least the following elements. The wireless apparatus includes an application processor configured for generating one or more packets associated with an application service. The application processor is also configured for receiving a real time metric for a radio frequency access link associated with the application service. Furthermore, the application processor is configured to adjust packet generation based on the received real time metric. The wireless apparatus also includes a transceiver configured for receiving the one or more packets from the application processor. The transceiver is also configured to transmit the one or more packets through the radio frequency access link to a wireless communication network. The transceiver is further configured to monitor the real time metric of the radio frequency access link and to provide updates of the real time metric to the application processor.

In yet another embodiment, a computer program product encoded in a computer readable medium for adapting transmission to improve quality of service in a mobile device is described. In the mobile device, non-transitory computer program code generates a plurality of packets for an application service connection between the mobile device and a remote device through a wireless network. The computer program product also includes non-transitory computer program code for transmitting the plurality of packets through a radio frequency access link between the mobile device and the wireless network. The mobile device also includes non-transitory computer program code for monitoring a real time property of the radio frequency access link through which the plurality of packets is transmitted. The mobile device includes non-transitory computer program code for modifying the generating or the transmitting of the plurality of packets based on the monitored real time property of the radio frequency access link.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
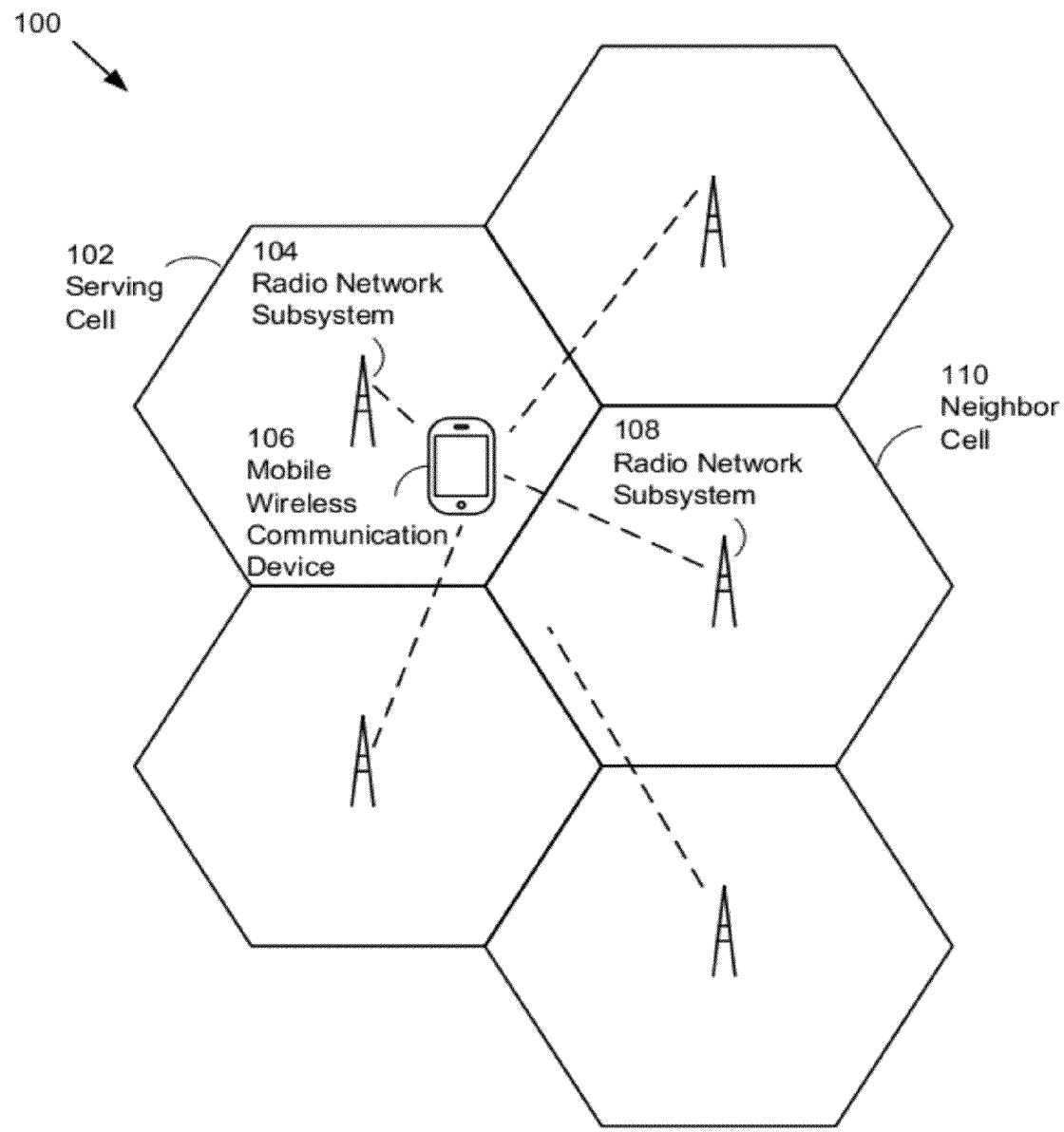
FIG. 1 illustrates a mobile wireless communication device located within a wireless cellular communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The growth of high speed communication links has enabled a common infrastructure, such as the internet, to carry a diverse array of applications including voice, audio, video, gaming, data transfer, and many others simultaneously. Different applications that access different services across a communication link can require different quality of service (QoS) properties to operate properly. Packets generated by each application can be treated differently rather than identically when transported through the communication link. Different applications can require that packets have different amounts of delay, jitter, loss rates and throughput. Some applications can be more sensitive to time delays, such as conversational voice, video conferencing and interactive gaming. Other applications can require guaranteed arrival of the packets with no packet loss for a highly reliable connection such as when securely downloading data files.

The internet was originally designed to provide a best-effort service, and while QoS capabilities have been added, adapting an application to function well over an underlying, dynamically varying connection can further improve performance. The access portion of communication networks, particularly wireless radio access links, can share a limited bandwidth of available resources among many users simultaneously, and each user can use multiple applications. Mobile devices can provide an application service that can be transported through many different types of connections, and a user can expect similar performance from the application service independent of the connection over which packets for the connection can be transported. Achieving a desired QoS treatment for internet packets, also known as internet protocol (IP) datagrams, originally designed for transport through higher layer processing nodes, such as routers within a communication network, over a limited bandwidth radio access link can prove challenging. In a typical implementation, QoS at a higher layer, such as used by IP routers at an internet layer can be defined and maintained separately from QoS at a lower layer, such as used by wireless transceivers and access network systems at a link layer. Both QoS at the internet layer and QoS at the link layer can serve to satisfy an application's requirements, and two different QoS mechanisms can be used in parallel. Providing local near end feedback between lower layer functions that manage transport across a wireless access connection and higher layer functions that generate packets for transport on the wireless access connection can more rapidly adapt an application service to variable link conditions.

An application service running in a mobile device can be connected to a parallel application service running in a remote device through an intervening communication network. The connection between the mobile device and the remote device can traverse both wireless and wired segments. Wireless access segments can use one of many different wireless access technologies. The application service in the mobile device can adapt to variations in conditions through the communication network connection based on far end feedback from the remote device; however, this far end feedback can incur significant delay before reaching the mobile device, thereby limiting the rapidity with which the application service can respond to changing network conditions. Typical metrics used for far end feedback can be based on moving averages that require multiple received packets to adapt to changes in the communication network connection. A lower reliability and higher delay that can be incurred by the packets can adversely impact robustness and responsiveness of adaptation to changing conditions.

Immediate local near end feedback from a baseband transceiver co-located in the mobile device in which an application processor runs the application service can provide additional information to which the mobile device can adapt. Local feedback can include "coarse" metrics associated with a wireless access portion of the connection between the mobile device and the remote device. Coarse metrics can include wireless access channel quality metrics such as channel bandwidth, QoS profiles and received or measured signal strengths. The application processor can modify the generation of packets for the application service, and the baseband transceiver can modify the transmission of packets over a wireless link that supports the application service in order to improve quality of service. Adapting the application service based on these coarse metrics can provide a coarse tuning of the application service's behavior as the coarse metrics can change slowly over time. Local feedback can also include "fine" metrics associated with properties of the wireless access portion of the connection that change more rapidly. These fine metrics can include measures of the transmission rate of the wireless access portion of the connection, data transfer rates out of one or more queues that transfer data through the connection and queue levels measured at regular time intervals. The fine metrics can be monitored in real time by a transceiver and reported back to the application processor. Adapting the application service based on these fine metrics can provide a fine tuning of the application service's behavior.

The application processor can generate multiple packet types for a single connection, such as a combination of video packets and audio packets for a real time interactive "videophone" connection. Similarly, the video packets can consist of different types, such as packets containing reference video frames and other packets containing non-reference video frames. Classification of the packets into a multiplicity of packet types can be known to both the application processor and to the baseband transceiver that transmits the packets through a wireless access portion of the connection. The application service can accord different priorities to different packet types, for example based on how a loss or delay of a packet of a particular type can affect the application service's quality of service. Packets generated by the application processor can be marked directly (such as using an in-band field or segment within the packet) or indirectly (such as using an out-of-band signaling message that accompanies the packet).

The baseband transceiver can use the packet classification to direct the packets into one or more queues and to track different packet types within the one or more queues. In a representative embodiment, each queue can be associated with a radio access link connection having a set of properties that can affect quality of service. A single queue can contain packets having different classifications.

The baseband transceiver can monitor real time properties of the radio access link connection, including a level of a queue that feeds the connection and a data transfer rate out of the queue. The queue level and outgoing data transfer rate measured can average all of the packets contained in the queue or can more specifically measure packets associated with a single application. Available radio access link resources, as assigned by control mechanisms in the wireless communication network, can vary considerably during a connection due to changing conditions in the wireless access network. Signals can vary in attenuation, noise and interference encountered, and the wireless access network's bandwidth can be shared among multiple applications and multiple users simultaneously. Thus a wireless access connection can support transmissions with varying rates (or bursts of varying size) rather than a continuous consistent data transfer rate.

The size of one or more baseband queues in the mobile wireless device can be chosen based on a maximum roundtrip acknowledgement time from the far end remote device. In representative embodiments, baseband queue sizes can be relatively large to ensure data is always available to send over a best effort radio access link connection. As a full baseband queue in the baseband transceiver can impede acceptance of new data packets generated by an application processor in the mobile device, corrective action can be taken to adjust the generating or transmitting of the data packets when high latency delays or data rate throttling occurs on the wireless radio access link. Real time information can be monitored by the baseband transceiver and provided to the application processor. Data packets within the queues can be selectively dropped based on commands and control from the application service, and data packet generation can be adjusted to accommodate changing conditions on the wireless communication link thereby improving quality of service for an application service connection. Additionally, information about dropped packets can be reported by the baseband transceiver to the application processor, and the application processor can take definitive action on how to react immediately to the reported information.

FIG. 1 illustrates a wireless communication network 100 of overlapping wireless communication cells to which a mobile wireless communication device 106 can connect. The wireless communication network 100 can operate according to one or more different communication protocols such as a Global System for Communications (GSM) protocol, a Universal Mobile Telecommunications System (UMTS) protocol or a Long Term Evolution (LTE) protocol developed and maintained by the Third Generation Partnership Project (3GPP), a collaboration of several telecommunication standards organizations. Alternatively the wireless communication network 100 can operate using one of the set of Code Division Multiple Access 2000 (CDMA2000) standards developed by the 3GPP2. The discussion herein will primarily focus on UMTS but the same ideas apply to other wireless access network technologies.

Each wireless communication cell can cover a geographic area extending from a centralized radio network subsystem (RNS). Representative mobile wireless communication devices 106 can include "smart" phones and mobile computing devices with wireless connectivity. Mobile computing devices can also be used when attached with a wireless connectivity device. A wireless connection capability can be included internal to the mobile wireless communication device 106 or can be realized by appending an external wireless device to a mobile computing device, such as a modem dongle attached to a laptop computer. The mobile wireless communication device 106 can receive communication signals from a number of different cells in the wireless communication network 100, each cell located at a different distance from the mobile wireless communication device 106. The mobile wireless communication device 106 can be connected to a radio network subsystem 104 in a serving cell 102 and can be aware of neighbor cells in the wireless communication network 100, such as radio network subsystem 108 in neighbor cell 110. The radio resources that connect the mobile wireless communication device 106 to a cell can be limited and shared among multiple mobile wireless communication devices. The mobile wireless communication device 106 can support multiple parallel flows to the radio network subsystem 104 that can each provide different quality of service (QoS) characteristics. Packets originating at the mobile wireless communication device 106 from different applications can be mapped to different flows based on each application's QoS requirements.

Figure 2:
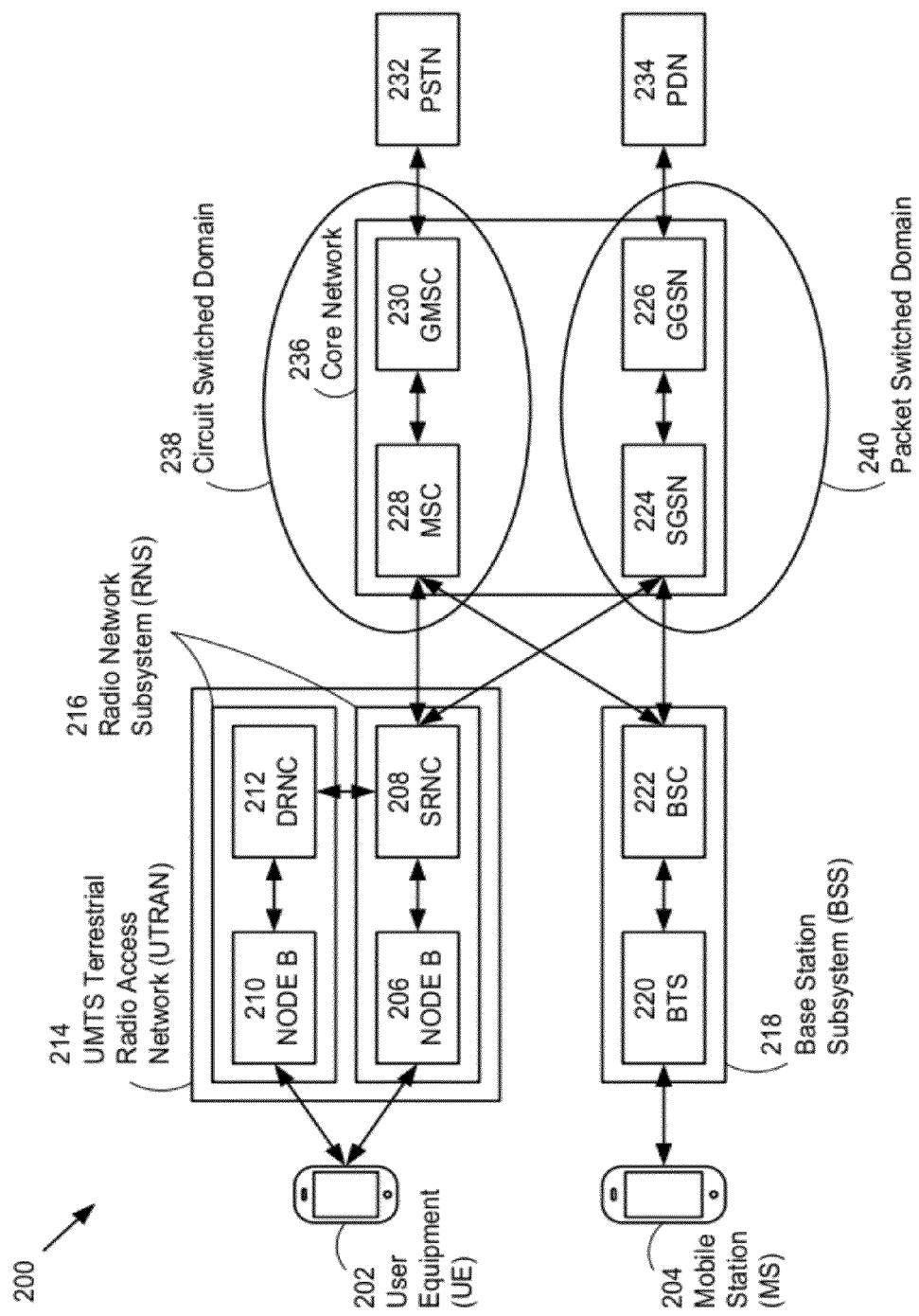
FIG. 2 illustrates a hierarchical architecture for a wireless communication network.

FIG. 2 illustrates a hybrid hierarchical architecture 200 for a wireless communication network that includes both UMTS and GSM radio access network elements. A mobile wireless communication device 106 operating in a GSM wireless communication network can be referred to as a mobile station (MS) 204, while a mobile wireless communication device 106 operating in a UMTS network can be referred to as user equipment (UE) 202. Wireless mobile communication devices 106 can include the capability of connecting to multiple wireless communication networks that use different wireless radio network technologies, such as to a GSM network and to a UMTS network; thus the description that follows can also apply to such "multi-network" devices as well as single network devices. The MS 204 can connect to the GSM wireless communication network through a radio network subsystem known as a base station subsystem (BSS) 218. The BSS 218 can include a base transceiver station (BTS) 220 that transmits and receive radio frequency signals between the MS and the wireless communication network and a base station controller (BSC) that manages the communication between a core network 236 and the MS 204. In a GSM wireless communication network, an MS 204 can be connected to one BSS at a time. As the MS 204 moves throughout the GSM wireless communication network, the BSC 222 can manage handover of the MS 204 to different BTS 220 located in different cells.

The GSM radio access network BSS 218 connects to a centralized core network 236 that can provide circuit switching and packet switching capabilities. The packet switching capability can provide a General Packet Radio Service (GPRS) that transmits internet protocol (IP) packets between the MS 204 and external data networks. A GSM network having GPRS capability can also be referred to as a 2.5 G network. QoS characteristics for a data packet carrying connection between the MS 204 and the public data network 234 can be established when a packet data protocol (PDP) context is set up for the connection. The MS 204 can request particular QoS characteristics such as a packet delay or an average data rate throughput when establishing the connection. The wireless network can accept or reject the request from the MS 204. While the wireless network can accept the request form the MS 204, during an active connection between the MS 204 and the BSS 218, the instantaneous data rate can vary thereby affecting the performance of an application service that can require a stable data rate. A best effort connection can also be used in which a specific data rate can not be guaranteed.

The core network 236 can include a circuit switched domain 238 that can carry voice traffic to and from an external public switched telephone network (PSTN) and a packet switched domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched domain 238 and the packet switched domain 240 of the core network 236 can each operate in parallel, and both domains can connect to different radio access networks simultaneously. The Universal Terrestrial Radio Access Network (UTRAN) 214 in the UMTS wireless access network can include multiple radio network subsystems (RNS) 216. Each RNS 216 can include a "Node B" 206/210 that transmits and receives radio frequency signals. The RNS 216 can also include a radio network controller (RNC) 208/212 that manages communication between the "Node B" 206/210 network elements and the core network 236. Unlike the MS 204 in the GSM radio access network, the UE 202 can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that provides additional radio link resources through a secondary Node B 210 that supplements the radio link through the primary Node B 206.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same frequency spectrum. Received signals can be demodulated by correlating them with a correctly matched de-spreading code. As the set of spreading codes used in W-CDMA can be mutually orthogonal, signals intended for a particular UE can be separated from signals transmitted to other UE, even though all of the signals can overlap and use the same frequency spectrum simultaneously. UMTS spread spectrum signals can occupy a wider 5 MHz channel bandwidth compared with a narrower 200 kHz channel bandwidth used by GSM signals.

In order for the UE 202 to communicate to the RNS 216, a radio resource, such as a radio access bearer (RAB) having a particular frequency and spreading code, can be allocated by the RNS 216 in response to a service request from the UE 202. Radio resources can be allocated when requested and available and de-allocated when not used in order to share the radio frequency spectrum among multiple UEs 202. To use the GPRS capability of the wireless communication network, the UE 202 can "attach" to the network and "activate" a packet data protocol (PDP) context. By attaching to the network, the UE 202 identifies itself and the wireless communication network 100 confirms the location of the UE 202. Activating the PDP context can enable IP traffic transfer through radio resources on an "air" interface between the UE 202 and the RNS 216. The UE 202 can obtain an IP address and can establish a logical connection with a quality of service (QoS) profile through the UMTS network. A UE 202 can have multiple PDP contexts active simultaneously, and each PDP context can use a different RAB.

While FIG. 2 illustrates elements of a wireless communication network based on a GSM or UMTS technology, a similar hierarchical architecture of components can apply to other wireless access technologies, such as the established CDMA2000 standardized protocol and the emerging "Long Term Evolution" (LTE) protocols. Comparable mobile communication devices to the UE 202 and MS 204 can connect to access network systems using wireless radio access technology. Managing QoS for an application service in a mobile communication device at an internet protocol (IP) network layer and at a lower level radio link layer can be accomplished for these protocols similarly to those described herein for GSM and UMTS protocols.

Figure 3:
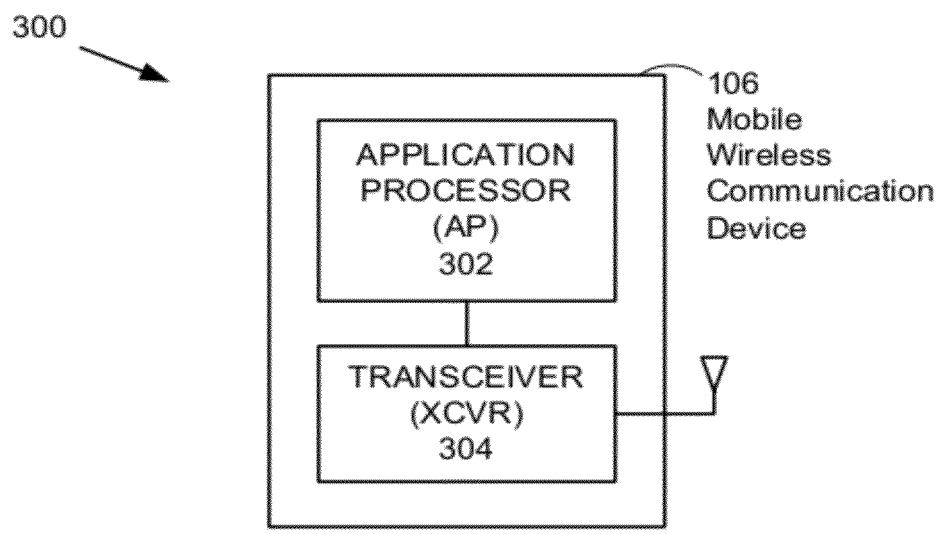
FIG. 3 illustrates components of the mobile wireless communication device.

FIG. 3 illustrates typical components of the mobile wireless communication device 106 such as the MS 204 or the UE 202. An applications processor (AP) 302 can perform higher layer functions, such as maintaining an IP stack and requesting and releasing data connections. The AP 302 can generate IP packets (also known as datagrams) and transfer them to a baseband transceiver (XCVR) 304 for processing into lower layer packets, also called protocol data units (PDUs). The lower layer PDUs can be formatted appropriately for transmission over a wireless connection. The XCVR 304 in the mobile wireless communication device 106 can transmit and receive lower layer packets that correspond to higher layer signaling and data packets through a radio "air" interface to the RNS 216 in the wireless communication network 100. The AP 302 and XCVR 304 can be both contained within the mobile wireless communication device 106. Alternatively a XCVR 304 can be externally attached to a mobile computing device (not shown) to provide similar wireless connectivity and thereby together form a mobile wireless device. The interface between the AP 302 and the XCVR 304 can be a proprietary interface or a standardized interface.

Figure 4:
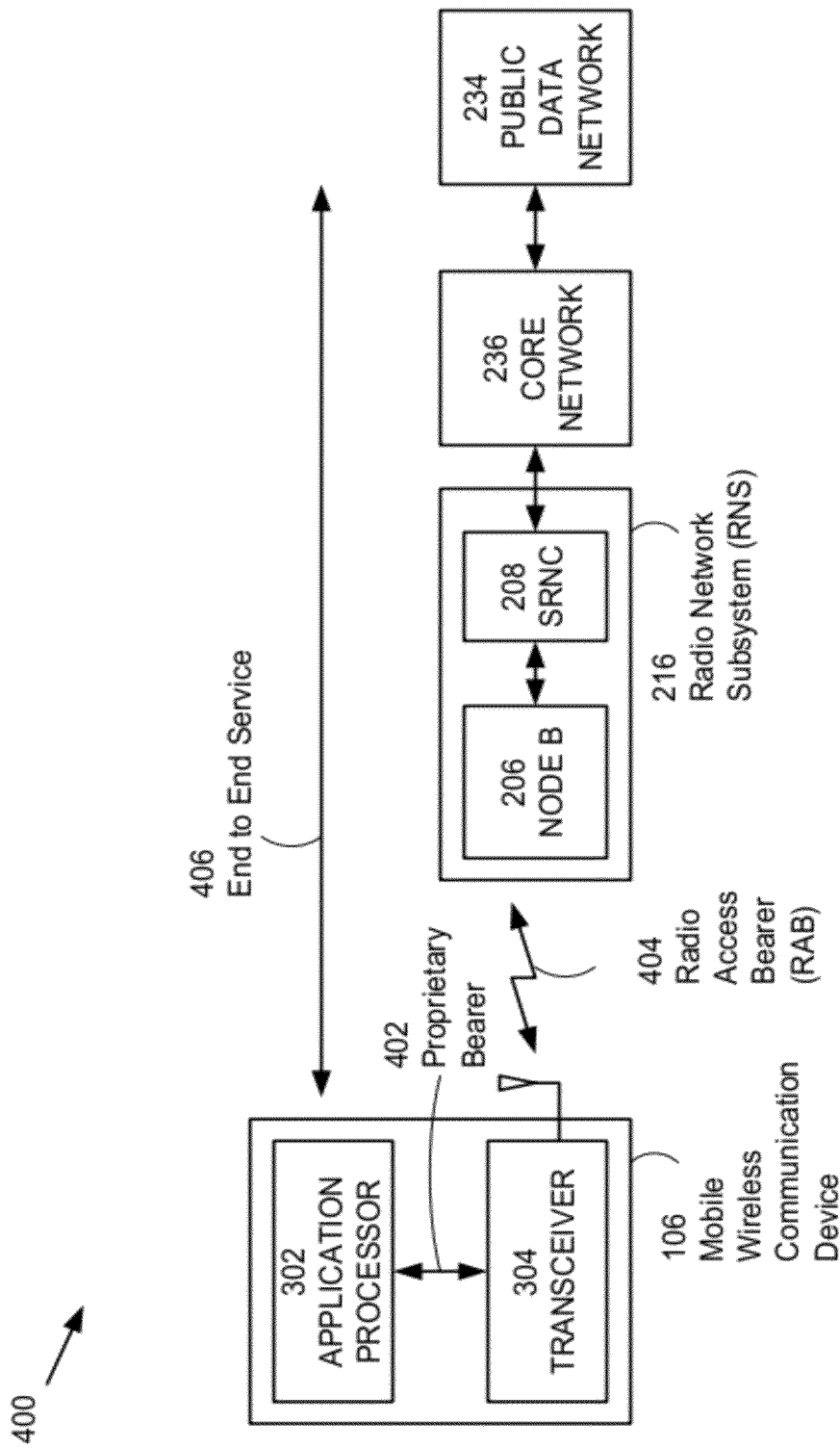
FIG. 4 illustrates connections of the mobile wireless communication device to elements of the wireless communication network.

FIG. 4 illustrates the mobile wireless communication device 106 connected to the public data network 234 to provide an end to end service 406 between the application processor 302 in the mobile wireless communication device 106 and an endpoint (not shown) in (or attached to) the public data network 234. The end to end service 406 can include an application service connection that supports bi-directional communication using a combination of one or more of video, audio and data. The endpoint can include a remote device, such as another mobile wireless communication device 106 with similar capabilities. The end to end service 406 can operate at an application level and can use a set of interconnected bearers to transport IP packets between the mobile wireless communication device 106 and the endpoint. Different bearers can be used to connect between individual nodes within the connection. A proprietary bearer 402 can connect between the AP 302 and the XCVR 304 within the mobile wireless communication device 106. Separately, a radio access bearer (RAB) 404 can connect between the mobile wireless communication device 106 and the RNS 216 in the wireless access portion of the wireless communication network. Additional bearer services within the wireless network can exist (although not shown explicitly in FIG. 4). Bearers can exist within the core network 236, and additional bearers can connect a gateway (such as the GGSN 226 in the packet switched domain 240 of the CN 236) to the endpoint in the PDN 234.

Each bearer can have a set of associated bearer service QoS parameters provided to a user of the bearer. UMTS communication protocols describe several traffic classes having different QoS characteristics, including conversational, streaming, interactive and background classes. Conversational and streaming classes can be used to transport delay sensitive packets, while interactive and background classes can support applications with less stringent delay requirements. Each class can also have QoS parameters associated with delay variation (jitter) and packet loss rate among others. An example of an application that can use the conversational traffic class is a voice over IP (VoIP) application. IP packets carrying voice can have low delay requirements and can require that the IP packets be delivered in a strict order. The conversational class can tolerate some voice packet loss. Other applications that can use the conversational traffic class include video telephony and video conferencing, which can carry a multimedia combination of audio, video and data transfer, as well as interactive gaming. Conversational class applications can typically involve two-way data transfer.

A streaming class application can provide a one-way data transfer such as audio and video streaming having less strict delay requirements and limited (if any) interactivity by the user. To achieve an acceptable quality of playback of the streamed audio and video, the packet loss rate can be lower for the streaming class application than for a voice or video telephony application using the conversational class. The delivery order of packets in a streaming class can be preserved for proper playback of the received audio or video stream.

An interactive traffic class can support applications with less delay sensitivity than conversational and streaming classes. Representative applications that can use the interactive traffic class include web browsing and accessing e-mail. With less restrictive delay requirements, an interactive traffic class connection can offer an improved bit error rate (and an improved packet loss rate) by adding error correction and retransmissions. Finally a background traffic class can be used for applications without strict delay requirements. The background class can provide high data integrity, such as used for file transfer protocols.

UMTS bearers can define values or ranges for specific QoS attributes for each traffic class, such as an acceptable packet loss rate, maximum delay latency and requirements for packet delivery order. UMTS bearers, such as the radio access bearer 404 between the mobile wireless communication device 106 and the RNS 216, can simultaneously support traffic from multiple applications in the mobile wireless communication device. The application processor 302 can generate IP packets that include a header that specifies a requested QoS treatment for that IP packet. The QoS mechanisms for the wireless link used by the wireless XCVR 304 in the mobile wireless communication device 106 and QoS mechanisms used by the RNS 216 in the wireless access network can be separate and not well integrated with each other. How to invoke a particular set of QoS properties on the wireless RAB 404 for an application's IP packets that originate at the application processor 302 can be not well defined. To overcome this deficiency, communication about an IP packet's QoS requirements can be transported along with the IP packet through a "proprietary" bearer 402 to the XCVR 304. The XCVR 304 can then map the IP packet to an appropriate RAB 404 having a desired QoS characteristic, such as for a particular traffic class as described above.

Figure 5:
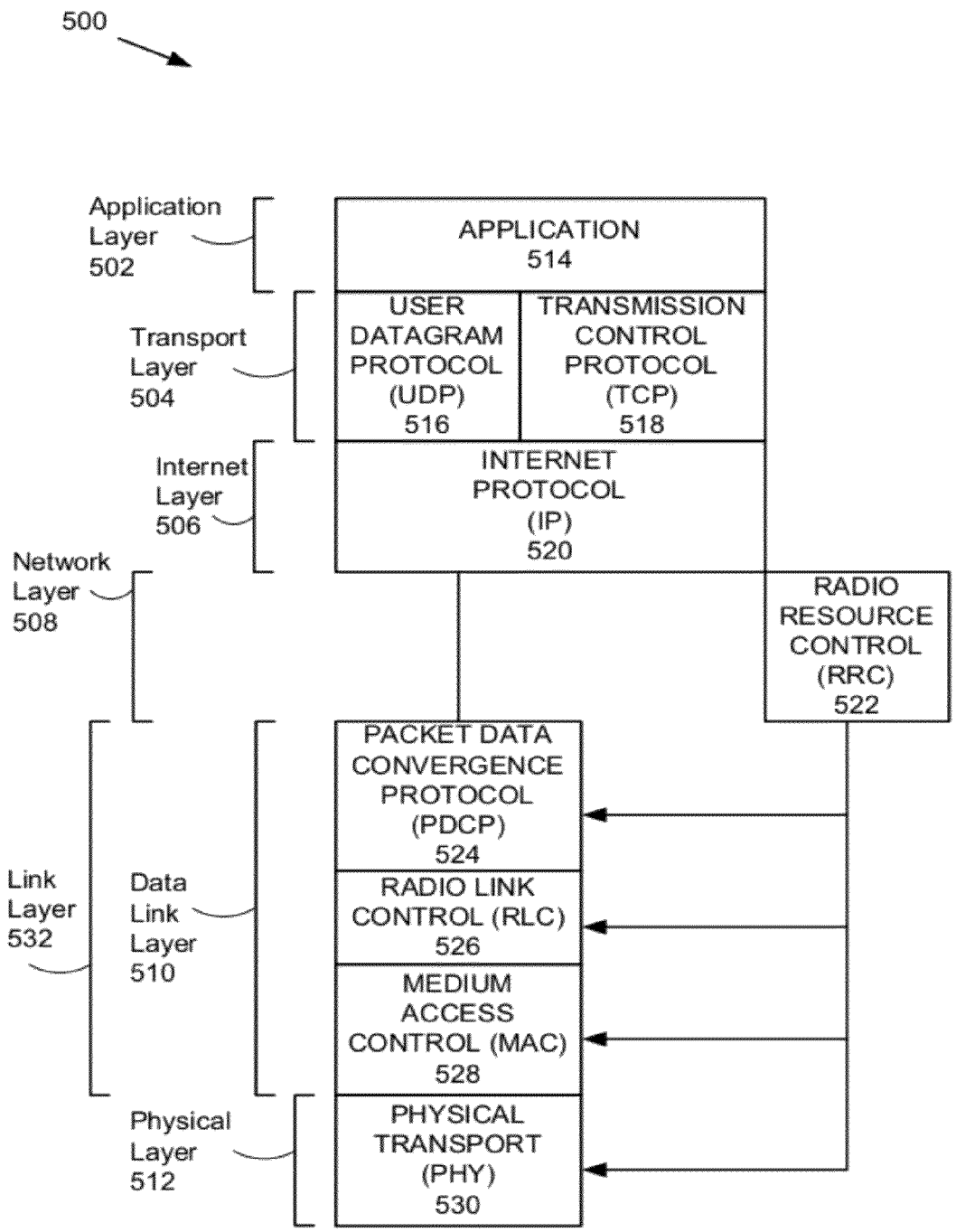
FIG. 5 illustrates a layered communication protocol stack.

FIG. 5 illustrates a hierarchical stack 500 of communication protocols that can be used by the mobile wireless communication device 106 as well as by processing blocks in nodes across the communication link for an end to end service 406. Higher layers in the hierarchical stack 500 can be closer to processing by the application, while layers lower in the stack can be closer to the transmission of data across a physical link. An application 514 in an application layer 502 can generate user data and communicate that data to another peer level application located in a parallel application layer across a communication link. Some well known protocols that can operate at the application layer 502 level include the hypertext transfer protocol (HTTP) such as used for web browsing and the file transfer protocol (FTP) used to copy data between host computers. The application 514 in the application layer 502 can pass the user data down to lower layers in the hierarchical stack 500 for additional formatting and processing in order to communicate the user data across the communication network.

Application level data generated at the application layer 502 can be passed to a transport layer 504 that can transfer the application level data to a peer transport layer 504 at the other end of the communication link. Two common transport layer protocols include the Transmission Control Protocol (TCP) 518 and the User Datagram Protocol (UDP) 516. TCP 518, a connection-oriented protocol, can ensure that application level data arrives in proper order with minimal errors. Duplicate data can be discarded, and lost data can be retransmitted. Thus TCP 518 can be considered to provide reliable data transport. UDP 516, a connectionless protocol, can provide a less reliable link that can be used for applications that can tolerate out of order data, missing data, data received with errors and duplicate data. Applications that can be more sensitive to delay but less sensitive to packet loss, such as VoIP, can prefer to use UDP 516 rather than TCP 518 for data transport. The transport layer 504 can format the received application data into a packet (or datagram) and pass the packet to an internet layer 506.

The internet layer 506 can include an Internet Protocol (IP) 520 to provide transmission of packets between networks, i.e. routing the packets from a source to a destination. The transport layer packet (e.g. a UDP datagram) can be encapsulated into an IP packet that includes an IP header with an IP address that can specify the source and destination for the IP packet. A router can read the IP header to determine to which node to forward the packet in order to reach its destination. The application processor 302 in the mobile wireless communication device 106 can process the application data through the top three layers in the hierarchical stack 500 and then pass an IP packet to the transceiver 304 for further processing into an appropriate form for transmission over the wireless radio access bearer (RAB) 404.

The transceiver 304 can include processing elements to implement a data link layer 510 (also called a link layer 532) that includes several sub-layers. The data link layer 510 can include a packet data convergence protocol (PDCP) 524 layer, a radio link control (RLC) 526 layer and a medium access control (MAC) 528 layer. The application, transport and internet protocol layers higher in the protocol stack can be independent of any physical hardware networking technology used to actually transmit and receive data over a physical medium. The lower layers can convert the IP packets to a form appropriate for transmission on the physical medium.

The PDCP 524 layer can perform IP header compression and decompression on the IP packet. The RLC 526 layer can segment and reassemble the modified IP packet into a sequence of link layer protocol data units (PDUs). In an acknowledged mode, the RLC 526 layer can ensure all link layer PDUs are received before reassembling the IP packet. The MAC 528 layer can multiplex and de-multiplex the link layer PDUs into transport blocks delivered to transport channels at the physical (PHY) layer 512. Different physical transport protocols 530 at the PHY layer 512 can be used for different physical media, such as different wireless access radio technologies as specified in wireless protocols including GSM, UMTS, CDMA2000 and LTE. A radio resource control (RRC) 522 processing unit at the network layer 508 can provide control of the data link layer 510 and physical layer 512.

Figure 6:
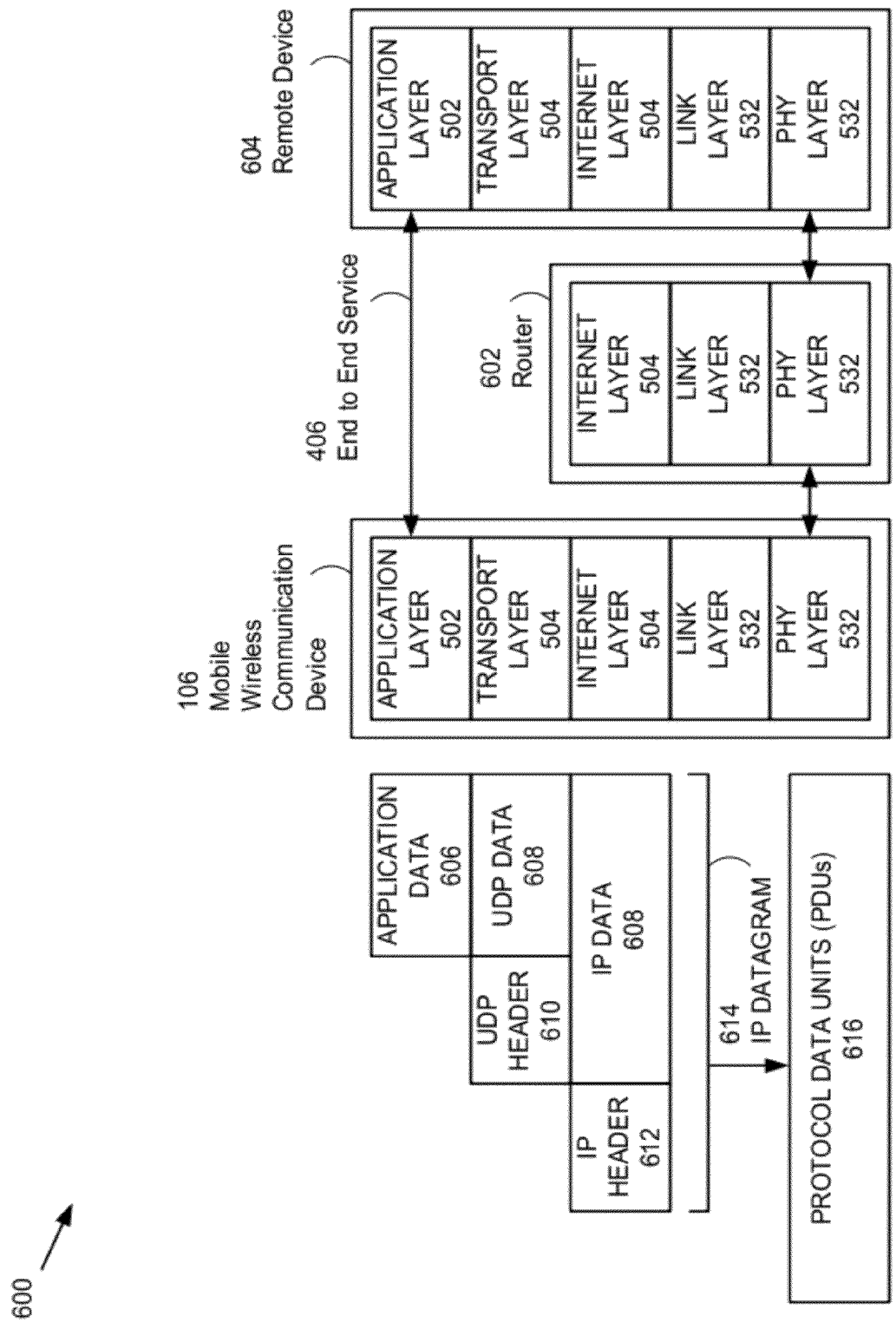
FIG. 6 illustrates packet formats for several layers in the layered communication protocol stack.

As shown in FIG. 6, a block 606 of application data originating at the application layer 502 in the mobile wireless communication device 106 can be encapsulated as UDP data 608. A UDP header 610 can be appended to the UDP data 608 in the transport layer 504 when using the UDP 516 transport layer protocol to form a transport layer packet. The transport layer packet can be passed to the internet layer 504 as an IP data block 608 which can in turn be encapsulated with an IP header 612 to form an IP datagram 614. The IP datagram 614 can be considered a basic unit of data that the application processor 302 delivers to the transceiver 304 in the mobile wireless communication device 106.

The transceiver 304, using a set of link layer 532 protocols can transform the IP datagram 614 into a series of lower layer protocol data units (PDUs) 616 that can be transmitted across a physical layer link. The IP header 612 can include an address for the destination, such as a remote device 604 to which an application in the mobile wireless communication device 106 can be connected to provide an end to end service 406. Multiple intermediate nodes can exist between the originating mobile wireless communication device 106 and the destination server 604. A router 602 at an intermediate node can forward the IP datagram 614 based on information in the IP header 612.

Figure 7:
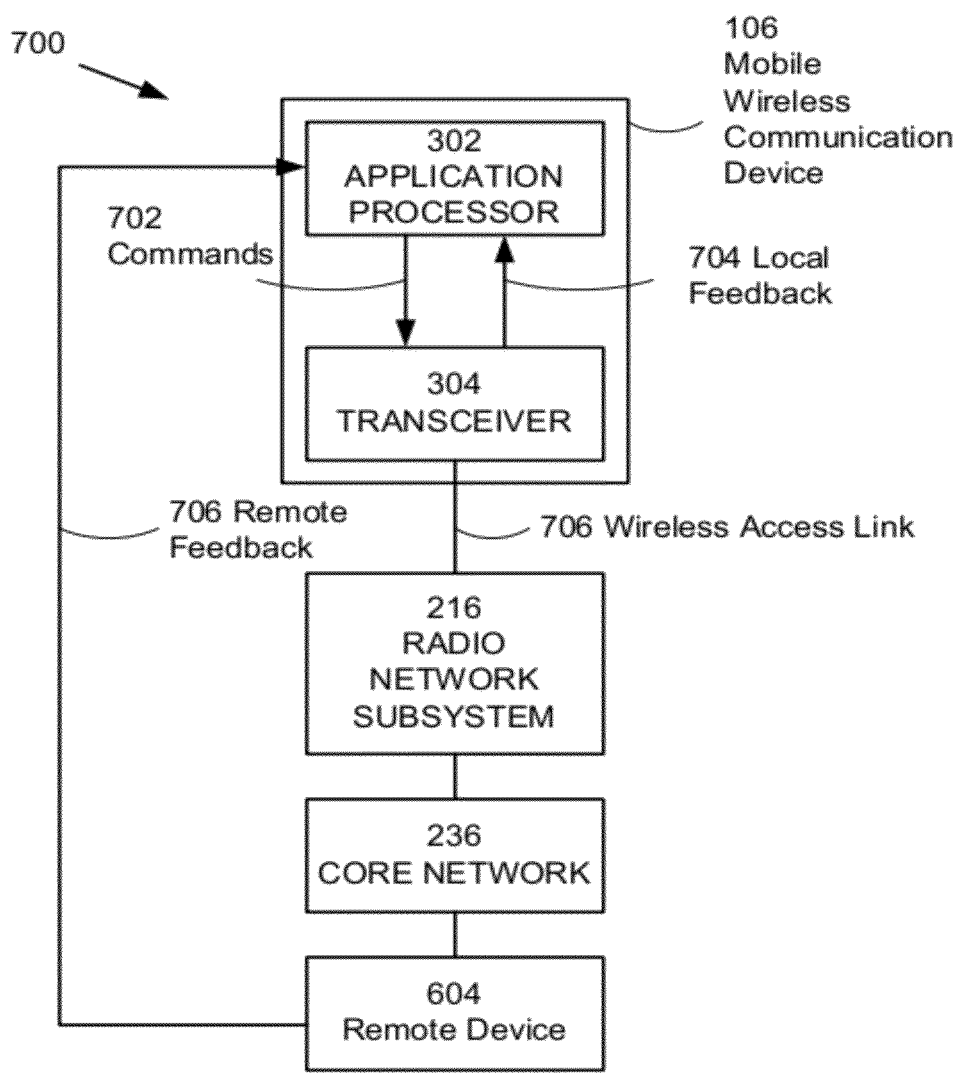
FIG. 7 illustrates control and feedback connections for a mobile wireless communication device connected to a remote device to provide an end to end service.

FIG. 7 illustrates control and feedback connections 700 for a mobile wireless communication device 106 connected to a remote device 604 to provide an end to end service 406. An application 514 can operate at an application layer 502 in an application processor 302 in the mobile wireless communication device 106. Remote feedback 706 from a parallel application 514 operating at a parallel application layer 502 in the remote device 604 can provide a level of quality of service, but the remote feedback path can be delayed and subject to reliability issues across the connection that traverses the connection in between. The transceiver 304 co-located with the application processor 302 in the mobile wireless communication device 106 can provide local feedback 704 in addition to the remote feedback 706 from the remote device 604. The local feedback 704 can arrive more rapidly and with greater reliability than the remote feedback 706, thereby enhancing control of the application 514 by the application processor 302 to provide improved quality of service. The local feedback 704 can include dynamic information about the wireless access link 706 as well as real time properties of structures and data flows within the transceiver 304. Some information provided in the local feedback can change slowly, thereby providing a mechanism for a coarse tuning of QoS, while other information provided can change rapidly enabling a fine tuning of QoS to dynamically changing network conditions. The local feedback 704 can be secure, reliable, quick and thorough and can provide significantly more detail about local network conditions on the wireless access link 706 that can affect QoS for the application 514. Dynamic real time properties, such as measures of traffic flows through the mobile wireless communication device 106 and wireless access link 706 qualities, can be used in addition to traditional application level QoS mechanisms to improve the QoS for the application service connection.

Figure 8:
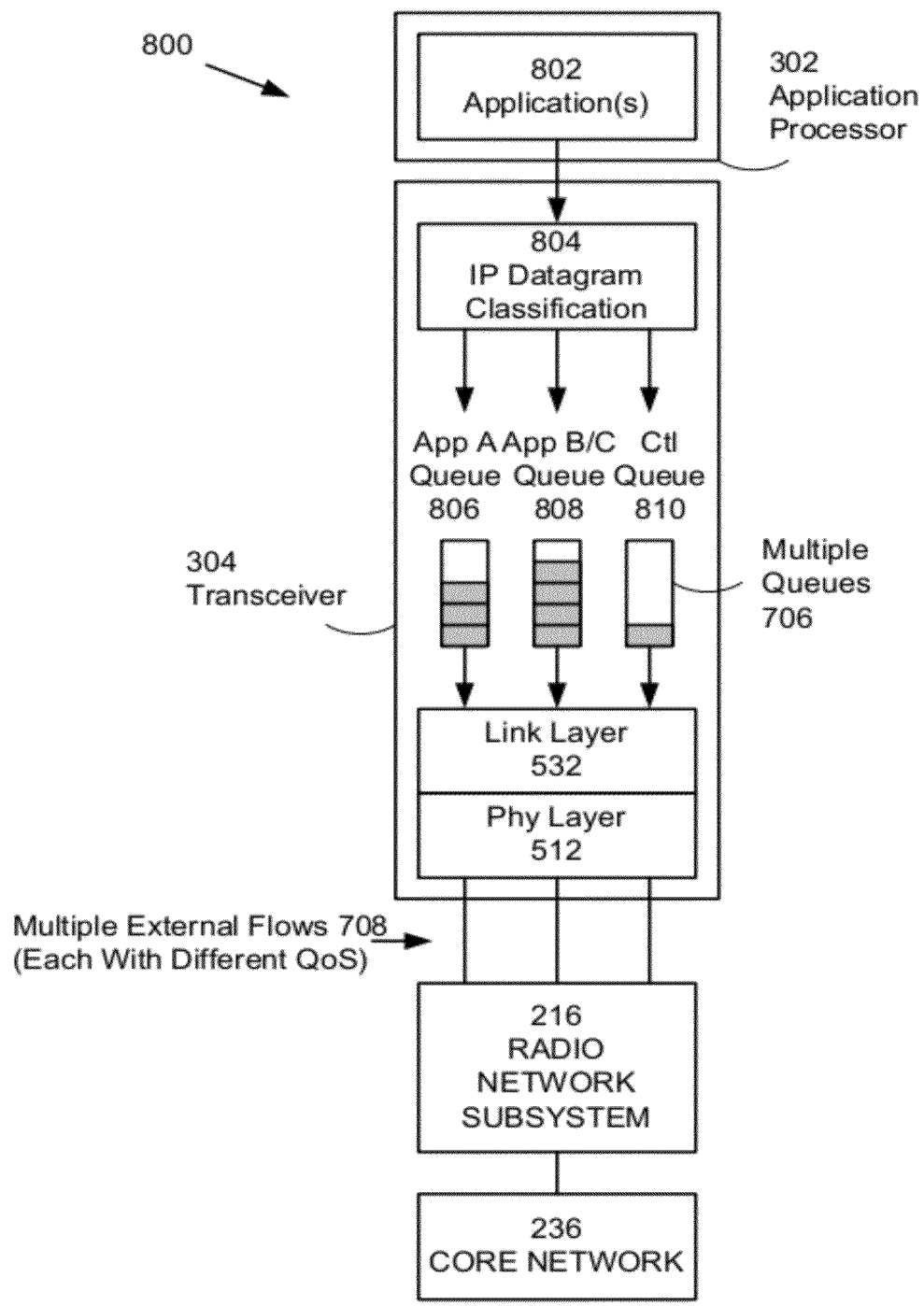
FIG. 8 illustrates multiple queues for packet classification.

FIG. 8 illustrates a structure 800 in which multiple queues 706 in the transceiver 304 of the mobile wireless communication device 106 support IP datagrams 614 generated by multiple applications 802 in the application processor 302. An IP datagram classification unit 804 can receive the IP datagrams 614 from the multiple applications 802 and can classify them according to tags provided for QoS treatment. The IP datagrams 614 can be divided by the IP datagram classification unit 804 into different queues 706 that can provide different QoS properties. The link layer 532 and physical layer 512 units can further modify the IP datagrams 614 to a size and form suitable for transport over multiple external flows 708 on a radio access network connection to the radio network subsystem 216 and then to the core network 236.

Some of the multiple queues 706 can support a single application, such as queue 806 that can contain IP datagrams 614 for an "Application A". Other of the multiple queues 706 can contain IP datagrams 614 generated by multiple applications, such as queue 808 for "Application B" and "Application C". A "Control" queue 810 can contain packets used for higher layer management, such as TCP acknowledgement packets. Packets in the control queue 810 can be prioritized over data packets, and data packets for one application can be prioritized over another application based on the queue in which they can be placed.

An application 802 that can provide real-time simultaneous audio and video can perform best when the application's data packet generation is well matched to a data rate through an external flow 708 when transported through a wireless access connection. On a "best effort" wireless access connection, an available data rate can vary considerably, and the audio and video quality can be adjusted to match the available data rate provided feedback can reach the application 802 that generates the data packets in a timely manner. Feedback at the higher layers from a remote device in which the end to end connection can terminate can incur more delay than needed to rapidly adjust the packet generation in the local mobile wireless communication device 216.

A queue, such as one of the multiple queues 706 in the transceiver 304 can accept data packets for the application 802. As the available radio link resources for the external flow 708 to the radio network subsystem 216 can vary, the number of packets removed from the queue can differ from the number of packets placed in the queue during a time interval. The queue size can be chosen to be relatively large, for example on the order of thousands of bytes of data, to ensure the queue can rarely empty entirely while the connection is active, thus always providing a steady, if irregular, stream of data packets for the application. Queue sizes can also be chosen based on whether a particular QoS is supported. For a "best effort" queue, the queue size can depend on a bandwidth delay product.

In order to provide improved quality of service, real time baseband information about the state of the radio access link can be provided from the transceiver 304 to the application processor 302. With updated information, the application processor 302 can react appropriately to rapidly changing radio access link conditions. Several different real time properties can be monitored and information reported back to the application processor 302. In a representative embodiment, real time properties of the queue supporting an application can be monitored by the transceiver 304 and information provided to the application processor 302 for the application 802. Real time properties can include a number of data bytes or bits transferred out from the queue during a time interval. The number of data bytes or bits transferred out can be associated with a particular application service connection, such as one supporting a simultaneous video and audio application service. The application 802 can apply adaptive rate control to its own data packet generation based on knowledge of the amount of data bytes transferred out of the queue. With adaptive rate control, queue levels can be kept at an optimal level to realize minimal delay and a best match between the application's data packet generation and the wireless access connections data packet transfer. Alternative real time properties, such as queue levels at specified time instants can also be monitored and conveyed to the application in place of or in addition to data transfer rates measured over a time interval.

A queue can also be shared by multiple applications, such as queue 808 shown in FIG. 8. One of the applications, such as application "B", can require rapid feedback, while another application, such as application "C", sharing the queue 808 can not require rapid feedback of the radio access link conditions. In case of a shared queue 808, rather than monitoring queue levels for all applications that use the queue 808, queue levels and data transfer rates for a specific application, such as application "B" can instead be reported by the transceiver 304 back to the application processor 302. When providing monitored information, the transceiver 304 can also preferably exclude trailing segments of a time interval over which the monitored information can be measured to exclude stalled intervals. Time intervals when a connection can be stalled can be included together in a subsequent interval. The monitored information can then represent the most recent data transfer rate or queue levels just prior to a current stall condition.

Figure 9:
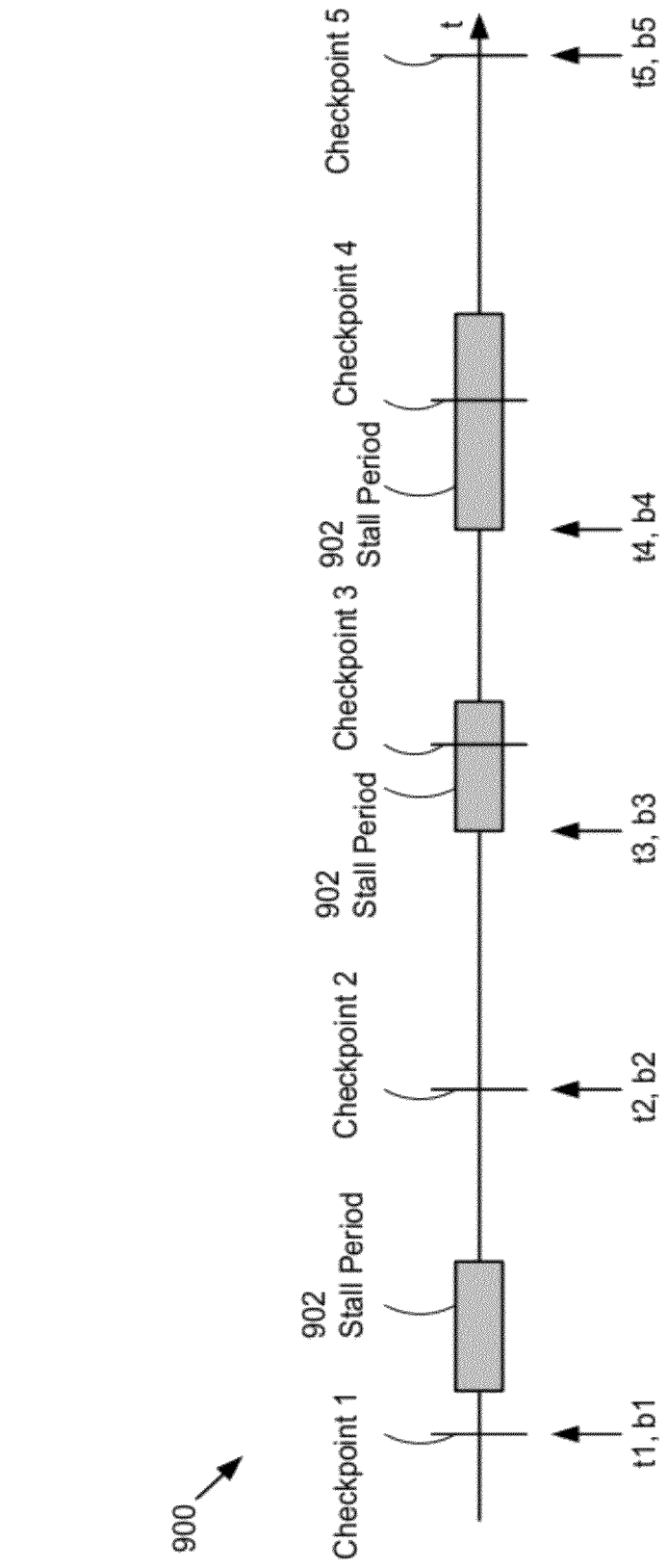
FIG. 9 illustrates reporting time intervals and queue levels for monitoring a real time property of a radio frequency access link.

FIG. 9 illustrates a timeline 900 that adjusts the information (e.g. time and queue levels) reported by the transceiver 304 to the application processor 302 when stall periods can occur at check point times. The transceiver 304 can check the queue levels at various check point times. These check point times can be regularly spaced as shown in FIG. 9 based on an expiration of a timer or can be irregularly spaced based on a polling (or other timing) mechanism. In a representative embodiment, after receiving a new data packet from the application processor 302, the transceiver 304 can determine whether the time interval between a last report and the current time exceeds a threshold, in which case a new report can be generated. Packet data transfer from the application processor 302 to the transceiver 304 can thus act as a polling mechanism, and checking the time intervals locally in the transceiver 304 can serve as a "timer" without incurring constant CPU cycles to update an actual timer. The application processor 302 can send "dummy" packets to the transceiver 304 in case the application 802 has no data to send to ensure that checkpoints and reporting intervals can occur.

Several stall periods 902 can exist during a connection, and while in a stall period, data transfer can not occur. A stall period 902 can be accounted for when measuring the data transfer rate or queue levels by including its time completely within a reporting time interval and not split between reporting time intervals. If a stall period 902 occurs completely between checkpoints, such as between checkpoints 1 and 2, then a pair of times reported t1 and t2 and a pair of queue levels reported b1 and b2 can correspond to those that occur at the checkpoint times. If a stall period 902 straddles two successive time intervals, such as the stall periods 902 shown at checkpoints 3 and 4, an earlier time and queue level can be reported instead of the time and queue level at the checkpoint times. The reported times t3 and t4 as well as the reported queue levels b3 and b4 can be the time and queue level when the last byte was transferred out of the queue prior to the respective stall period 902. The stall periods 902 can be included by reporting them entirely within a reporting time interval The queue levels reported b1 to b5 can be the number of bytes in a queue at the reporting time t1 to t5, or can be more specifically the number of bytes in a queue associated with a particular application or of a particular type. A data transfer rate for the entire queue or for a particular application or for a particular type of packet in the queue can be calculated using the difference between successive reported queue levels and the difference in times reported. Alternatively, instead of queue levels, the b1 to b5 values reported can refer to a cumulative numbers of bytes (or other suitable measure of data) transferred out of the queue during up to the reporting time. A difference in bytes transferred out can also be used to estimate a data transfer rate out of a queue.

In addition reporting real time properties of one or more queues in a transceiver 304 (which can directly or indirectly reflect real time data transfer rates), the transceiver 304 can also report on real time properties of the wireless radio access link over which the transferred bytes are transmitted to the wireless communication network 100. Suitable real time properties can include whether the link is congested, which radio access technology is currently used, what current bit rate is assigned to a radio resource (such as radio access bearer 404), a measured/received channel quality indicator, a signal strength indication, and a QoS profile assigned to a radio access bearer 404. Many of these real time properties can change slowly over time, as the wireless communication network 100 adapts transmission on the wireless access link 706. These real time properties can provide a "coarse" measurement of changing channel conditions, and reacting to them by the application processor 302 based on local feedback 704 from the transceiver 304 can realize a "coarse" tuning of QoS for an application.

As a representative embodiment, the radio access bearer 404 can be assigned an initial bit rate, such as 384 kbps, when a connection is established to support a simultaneous video and audio application. During the connection, the wireless communication network 100 can change the bit rate assigned to the radio access bearer 404 based on changing wireless access network conditions. For example the bit rate assigned to the radio access bearer 404 can change from 384 kbps to 128 kbps. The reduction in bit rate can cause queue levels in the transceiver 304 to fill up as the application 802 can continue to generate data packets at a rate faster than the wireless access link can transport them. As discussed above, regularly reporting the queue levels and outgoing data transfer rates in real time by the transceiver 304 can alert the application processor 302 indirectly of a change in bit rate supported by the wireless radio access link. Alternatively, direct local feedback 704 of the updated bit rate assigned to a radio access bearer 404 can also provide information to the application processor 302, and the application processor 302 can adjust data packet generation to better match the current bit rate rather than continuing to use the initial bit rate negotiated for the radio access bearer 404 when establishing the application service connection.

A combination of the wireless radio access link properties and the queue levels and data transfer rates can also be reported by the transceiver 304 to the application processor 302. The queue levels and data transfer rates can indicate a temporary change in the instantaneous throughput data transfer rate, even when the bit rate assigned by the wireless access network to the radio access bearer 404 remains unchanged. The application processor 302 can adjust packet generation or instruct the transceiver 304 to adjust packets awaiting transmission in the queue in response to changes in the instantaneous data transfer rates. For example, lower priority packets can be dropped or "aging" data packets that can be less useful to the remote device for a particular application service connection can be flushed. Adjustments to data packet generation or data packet transmission can continue until the data transfer rate improves.

The application processor 302 can respond to the monitored feedback information provided by the transceiver 304 to instruct the transceiver 304 to drop selectively or to flush data packets from one or more of the queues. The transceiver 304 can be aware of different classifications for data packets in the queues. The application processor 302 can command the transceiver 304 to drop one or more data packets for a particular application or to drop data packets of a particular classification from a queue. Oldest data packets can be dropped first (e.g. a command can indicate packets older than a certain time can be dropped).

Packet classifications can provide information to the application processor 302 about how sensitive the packets can be to being dropped or being delayed. Commands for selective dropping can differentiate between classes of packets based on their sensitivity to dropping and latency changes. Some classes of packets can be more sensitive to dropping than to latency changes, such as video packets, while other classes of packets can be more sensitive to latency changes than to dropping, such as audio packets. Multiple classes of packets can be present in the same queue, for example when time synchronization can be required between the classes of packets. The packets can be required to be sent in a particular sequence order out of the same queue. Using selective dropping, the overall QoS of an application can be improved. The application processor 302 can also instruct the transceiver 304 to flush the queue of all packets or of all packets having a certain classification. Drop and flush commands can provide a mechanism by which a queue can be "cleaned up" so that useful data can be transported more timely, especially when older packets can be less useful to the remote device's application.

As mentioned above, a rate of data packet generation by the application processor 304 can be adjusted based on the feedback information provided by the transceiver 304. Adapting the bit rate of an application, such as modifying a setting of a video codec or an audio codec that generates bytes for the data packets, can incur a time delay to take full effect. The drop and flush commands can be used in conjunction with adjusting a codec's rate of generating data packets to repair issues in a queue in advance of the codec's data rate adjustment effect being fully realized.

The transceiver 304 can also provide acknowledgement information to the application processor 302 indicating which data packets were dropped and/or flushed. Certain data packets can be more critical than others for certain applications. As a representative example, certain data packets known as "reference frames" for a video application can be required by a codec to properly decode a stream of video packets. If a reference frame is dropped or flushed, then the transceiver 304 can indicate this occurrence to the application processor 302, and the application processor 302 can generate a new reference frame data packet if required for proper functioning of a codec in the remote device.

Communication of commands 702 and local feedback 704 between the transceiver 304 and the application processor 302 can use a proprietary out of band messaging path or can use a proprietary set of in band messages (i.e. packets) having a format similar to the IP datagram 614. A packet can be sent from the transceiver 304 to the application processor 302 to notify the application processor 302 of real time properties of the radio frequency access link. The radio access technology used, such as GSM or UMTS, the data rate assigned to a radio access bearer, such as 64 kbps or 384 kbps, a queue depth, number of bytes transferred out of a queue and a last byte transmitted timestamp can be included as values within data segments of the packet in the form of an IP datagram. A single notification packet can include one or more of the real time property values. The notification packet can be sent based on expiration of a timer or in response to polling by the application processor 302. Dummy packets can be sent from the application processor 302 to the transceiver 304 to keep a timer running or to enable a polling mechanism.

The application processor 602 can send a command packet to the transceiver 304 in response to one or more notification packets received from the transceiver 304. The application processor 602 can instruct the transceiver to drop selectively packets of one or more types from a queue. The command packet can also instruct the application processor 602 to flush a queue of all packets pending. Specific packets can be targeted by the command packet by indicating a packet classification to be dropped. In a representative embodiment, packet classifications can include audio packets, video reference frame packets, video non-reference frame packets, signaling packets and redundant packets.

The transceiver 304 can send a drop notification packet to the application processor 302 in response to receiving one or more command packets. The drop notification can also service as a form of local feedback 704 between the transceiver 304 and the application processor 302. The drop notification packet can include and indication of the number of packets dropped of one or more packet classification types. The drop notification packet can also include information about dropped packet sequence numbers that can be used by a real time protocol (RTP) at the application layer 502 protocol in the application processor 302. The application processor 302 can use information provided by the drop notification packet to manage the transmission and generation of new packets for the application service connection.

Figure 10:
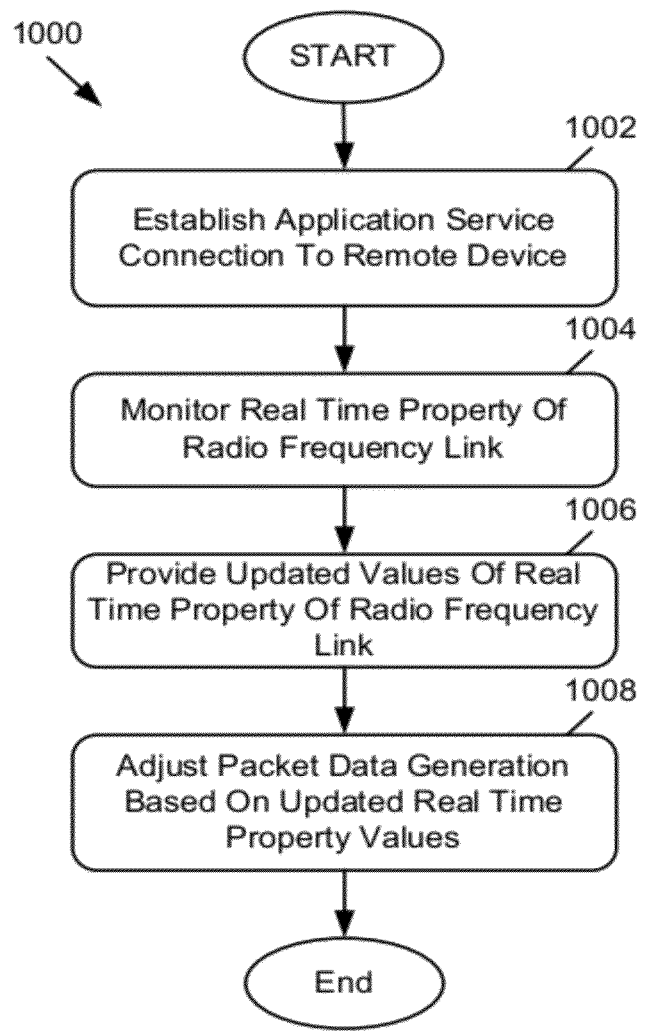
FIG. 10 illustrates a method to manage quality of service in a mobile wireless device.

FIG. 10 illustrates a method 1000 for managing quality of service for an application in a mobile wireless device 106. In step 1002, an application service connection can be established between the mobile wireless device 106 and a remote device. In an embodiment, the application service can include simultaneous video and audio transfer. In step 1004, the mobile wireless device 106 can monitor a real time property of a radio frequency link between the mobile wireless device 106 and a wireless communication network 100. In an embodiment, the real time property can be an effective data transfer rate associated with the application service connection. In other embodiments, the real time property can be a queue level associated with transporting data packets for the application service. In step 1006, updated values of the monitored real time property of the radio frequency link can be provided to a processing unit in the mobile wireless device 106. The real time property can be monitored by a transceiver unit (e.g. transceiver 304) and provided to an application processing unit (e.g. application processor 302) that can generate data packets for the application service connection. In step 1008, packet data generation can be adjusted by the mobile wireless device 106 based on the provided updated real time property values of the radio frequency link. Adjustments to data packet generation can include changing a packet data rate, altering queues, dropping packets and creating new packets in place of older packets. Adjustments can occur in the application processor and/or can occur in the baseband transceiver. Feedback of real time properties monitored by the baseband transceiver can impact the data generation by the application processor and data management by the mobile wireless device 106.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method to manage quality of service at a mobile wireless device, the method comprising:
    establishing an application service connection between the mobile wireless device and a remote device via a wireless communication network;
    communicating application data between the mobile wireless device and the remote device as part of the application service connection;
    monitoring, by the mobile wireless device, at least one real time property of a radio frequency access link between the mobile wireless device and the wireless communication network,
    wherein the at least one real time property of the radio frequency access link comprises an effective data transfer rate of a first portion of the application data communicated between the mobile wireless device and the remote device;
    determining updated values of the monitored at least one real time property of the radio frequency access link; and
    adjusting packet data generation for a second portion of the application data communicated between the mobile wireless device and the remote device based at least in part on the updated values of the monitored at least one real time property to manage a quality of service property of the application service connection.

2. The method as recited in claim 1, wherein the application data communicated between the mobile wireless device and the remote device includes video and audio data.

3. The method as recited in claim 1, wherein monitoring the at least one real time property of a radio frequency access link comprises measuring a number of data bytes or data bits transferred out of an application data queue of the mobile wireless device during a time interval.

4. The method as recited in claim 1, further comprising:
    monitoring a level of an application data queue of the mobile wireless device,
    wherein the level of the application data queue represents a number of data packets added to the application data queue and a number of data packets transferred out of the application data queue during a time interval.

5. The method as recited in claim 4, further comprising adjusting the level of the application data queue by dropping one or more data packets from the application data queue based at least in part on an application data priority of the one or more data packets dropped from the application data queue.

6. The method as recited in claim 1, wherein prior to communicating the application data between the mobile wireless device and the remote device, the application data is added to one or more application data queues that are classified according to different quality of service priorities.

7. The method as recited in claim 1, wherein the at least one real time property of the radio frequency access link further comprises a radio channel quality metric associated with an access network portion of the application service connection.

8. A wireless apparatus comprising:
    one or more processors;
    a transceiver coupled to the one or more processors; and
    a computer-readable storage medium coupled to the one or more processors, and storing computer-executable instructions, that when executed by the one or more processors, cause the wireless apparatus to:
    generate data packets of a plurality of applications running at the wireless apparatus;
    transfer the data packets of the plurality of applications to a remote device via a wireless communication network as part of an application service connection;
    monitor a data transfer rate of a first portion of the data packets of the plurality of applications transferred to the remote device as part of the application service connection; and
    adjust a packet data generation for a second portion of the data packets of the plurality of applications running at the wireless apparatus based at least in part on:
    i. the monitored data transfer rate of the first portion of the data packets of the plurality of applications transferred to the remote device; and
    ii. a priority assigned to corresponding data packets of each of the plurality of applications running at the wireless apparatus.

9. The wireless apparatus as recited in claim 8, wherein the priority assigned to corresponding data packets of each of the plurality of applications running at the wireless apparatus is based on an application data type of the corresponding data packets.

10. The wireless apparatus as recited in claim 8, wherein execution of the computer-executable instructions by the one or more processors further causes the wireless apparatus to:
    monitor a level of an application data queue of the wireless apparatus, wherein the level of the application data queue represents a number of data packets added to the application data queue and a number of data packets transferred out of the application data queue during a time interval.

11. The wireless apparatus as recited in claim 10, wherein execution of the computer-executable instructions by the one or more processors further causes the wireless apparatus to adjust the level of the application data queue by dropping one or more data packets from the application data queue based at least in part on an application data priority of the one or more data packets dropped from the application data queue.

12. The wireless apparatus as recited in claim 10, wherein execution of the computer-executable instructions by the one or more processors further causes the wireless apparatus to adjust the packet data generation for the second portion of the data packets of the plurality of applications running at the wireless apparatus by adjusting a codec of the wireless apparatus to provide a packet delay for data packets passing through the application data queue.

13. A non-transitory computer-readable storage medium storing computer-executable instructions, that when executed by one or more processors, cause a mobile device to:
generate data packets of a plurality of applications;
transfer the data packets of the plurality of applications to a remote device via a wireless communication network as part of an application data service connection;
monitor a data transfer rate of a first portion of the data packets of the plurality of applications transferred to the remote device as part of the application service connection; and
adjust a packet data generation for a second portion of the data packets of the plurality of applications based at least in part on:
i. the monitored data transfer rate of the first portion of the data packets of the plurality of applications transferred to the remote device; and
ii. a priority assigned to corresponding data packets of each of the plurality of applications.

14. The non-transitory computer-readable storage medium as recited in claim 13, wherein execution of the computer-executable instructions further causes the mobile device to:
measure an amount of data packets transferred out of an application data queue of the mobile device during a time interval,
wherein the application data queue contains one or more data packets of the plurality of applications prior to transferring the one or more data packets of the plurality of applications to the remote device as part of the application data service connection.

15. The non-transitory computer-readable storage medium as recited in claim 13, wherein execution of the computer-executable instructions further causes the mobile device to adjust the transfer of the data packets of the plurality of applications to the remote device by dropping one or more data packets from an application data queue, based at least in part on an application data priority of the one or more data packets dropped from the application data queue.

16. The non-transitory computer-readable storage medium as recited in claim 13, wherein execution of the computer-executable instructions further causes the mobile device to:
adjust generation of the data packets of the plurality of applications by changing a parameter of an encoder of the mobile device,
wherein changing the parameter of the encoder adjusts a rate of packet data generation of the encoder.

17. The non-transitory computer-readable storage medium as recited in claim 13, wherein execution of the computer-executable instructions further causes the mobile device to adjust a packet delay for data packets of the plurality of applications passing through an application data queue of the mobile device.

18. The method of claim 1, wherein the quality of service property of the application service connection is associated with an average data rate throughput or a packet delay for packet data communicated via the application service connection.

19. The method of claim 1, further comprising adjusting a level of application data in at least one queue of a plurality of application data queues of the mobile wireless device by selectively dropping data packets from the at least one queue of the plurality of application data queues based at least in part on a quality of service property of the application data in the at least one queue.

20. The method of claim 19, wherein the data packets are dropped from the at least one queue of the plurality of application data queues when the quality of service property of the application data in the at least one queue is lower than a corresponding quality of service property of application data in another queue of the plurality of application data queues.

21. The wireless apparatus as recited in claim 8, wherein execution of the computer-executable instructions by the one or more processors further causes the wireless apparatus to adjust a level of application data in at least one queue of a plurality of application data queues of the wireless apparatus by selectively dropping data packets from the at least one queue of the plurality of application data queues based at least in part on a quality of service property of the application data in the at least one queue.

22. The wireless apparatus as recited in claim 21, wherein the data packets are dropped from the at least one queue of the plurality of application data queues when the quality of service property of the application data in the at least one queue is lower than a corresponding quality of service property of application data in another queue of the plurality of application data queues.

23. The wireless apparatus as recited in claim 21, wherein the quality of service property of the application data in the at least one queue of the plurality of application data queues affects how application data of the application data service connection is presented at the remote device after at least a portion of the application data in the at least one queue is transferred to the remote device.

24. The non-transitory computer-readable storage medium as recited in claim 13, wherein execution of the computer-executable instructions further causes the mobile device to adjust a level of application data in at least one queue of a plurality of application data queues of the mobile device by selectively dropping data packets from the at least one queue of the plurality of application data queues based at least in part on a quality of service property of the application data in the at least one queue.

25. The non-transitory computer-readable storage medium as recited in claim 24, wherein the data packets are dropped from the at least one queue of the plurality of application data queues when the quality of service property of the application data in the at least one queue is lower than a corresponding quality of service property of application data in another queue of the plurality of application data queues.

* * * * *